United States Patent
Tsay et al.

(10) Patent No.: US 9,493,252 B2
(45) Date of Patent: Nov. 15, 2016

(54) LONG LIFE THRUSTER

(71) Applicant: Busek Co., Inc., Natick, MA (US)

(72) Inventors: Michael M. Tsay, North Chelmsford, MA (US); Vladimir J. Hruby, Waban, MA (US); Christopher M. Grenier, Dudley, MA (US); William P. Costa, Norfolk, MA (US); Derek J. Lafko, Holliston, MA (US)

(73) Assignee: Busek Co., Inc., Natick, MA (US)

( * ) Notice: Subject to any disclaimer, the term of this patent is extended or adjusted under 35 U.S.C. 154(b) by 460 days.

(21) Appl. No.: 14/259,468

(22) Filed: Apr. 23, 2014

(65) Prior Publication Data

US 2015/0001346 A1 Jan. 1, 2015

Related U.S. Application Data

(60) Provisional application No. 61/840,582, filed on Jun. 28, 2013.

(51) Int. Cl.
*B64G 1/40* (2006.01)
*F02K 9/68* (2006.01)

(52) U.S. Cl.
CPC .............. *B64G 1/401* (2013.01); *F02K 9/68* (2013.01)

(58) Field of Classification Search
USPC ............... 244/171.1, 73 R, 74, 53 R, 171.3; 60/218, 205
See application file for complete search history.

(56) References Cited

U.S. PATENT DOCUMENTS

| | | | | |
|---|---|---|---|---|
| 3,673,801 | A | * | 7/1972 | Goldberger .............. C06D 5/04 149/36 |
| 3,807,657 | A | * | 4/1974 | Brill ...................... B64G 1/401 244/1 R |
| 4,027,476 | A | | 6/1977 | Schmidt |
| 4,485,722 | A | | 12/1984 | Metz et al. |
| 4,527,389 | A | | 7/1985 | Biddle et al. |
| 4,578,946 | A | * | 4/1986 | Readman ................... B01J 7/02 60/39.462 |
| 5,223,057 | A | | 6/1993 | Mueller et al. |
| 5,485,722 | A | | 1/1996 | Schmidt et al. |
| 5,608,179 | A | | 3/1997 | Voecks et al. |
| 5,768,885 | A | | 6/1998 | Johnson et al. |
| 5,836,150 | A | * | 11/1998 | Garcia ................... B64G 1/401 60/251 |

(Continued)

OTHER PUBLICATIONS

Courtheoux et al., "Catalytic Decomposition of HAN-Water Binary Mixtures", 38$^{th}$ AIAA/ASME/SAE/ASEE Joint Propsulsion Conference & Exhibit, Jul. 7-10, 2002, pp. 1-10.

(Continued)

*Primary Examiner* — Christopher P Ellis
(74) *Attorney, Agent, or Firm* — Iandiorio Teska & Coleman, LLP

(57) ABSTRACT

A thruster includes a reactor including bundled metal elongate members therein configured to disassociate an introduced propellant flowing between the members, a combustor for combusting products of the disassociation, and a nozzle downstream of the combustor.

17 Claims, 3 Drawing Sheets

(56) References Cited

U.S. PATENT DOCUMENTS

| | | | | |
|---|---|---|---|---|
| 5,937,641 | A | * | 8/1999 | Graham .................. B01J 35/04 60/302 |
| 6,047,541 | A | | 4/2000 | Hampsten |
| 6,272,846 | B1 | * | 8/2001 | Schneider ................ C06D 5/08 60/218 |
| 6,505,463 | B2 | | 1/2003 | Kruse et al. |
| 6,698,184 | B1 | * | 3/2004 | Sowa .................... B64G 1/401 60/206 |
| 6,834,494 | B2 | * | 12/2004 | Lohner .................... B01J 7/02 29/890.01 |
| 6,931,832 | B2 | | 8/2005 | Berg et al. |
| 7,757,476 | B2 | | 7/2010 | Coste |
| 8,337,765 | B2 | | 12/2012 | Tonev et al. |
| 8,814,562 | B2 | * | 8/2014 | Jensen .................... F23Q 11/00 431/158 |
| 9,376,987 | B2 | * | 6/2016 | Nagao ...................... F02K 9/68 |
| 2009/0038958 | A1 | * | 2/2009 | Coyle ...................... B01J 4/002 205/628 |

OTHER PUBLICATIONS

Kuwahara, Takuo et al., "Thermal Decomposition Characteristics of HAN Composite Propellant", AIAA, 1997, pp. 1-8.

Jankovsky, Robert S., "HAN-Based Monopropellant Assessment for Spacecraft", AIAA, 1996, pp. 1-7.

Voecks et al., "Chemical Reactors Based on Catalyzed Wires", NASA Jet Propulsion Laboratory, Jan. 29, 2010, 2 pgs.

Smith et al., "Kinetics of Hydrazine Decomposition on Iridium and Alumina Supported Iridium Catalysts", Air Force Rocket Propulsion Laboratory, Edwards Air Force Base, Calif., Aug. 1973, No. AD-766 698, 37 pgs. total.

Meinhardt et al., "Development and Testing of New, HAN-Based Monopropellants in Small Rocket Thrusters", AIAA, No. AIAA-98-4006, 1998, pp. 1-10.

Chang et al., "Combustion Characteristics of Energetic HAN/Methanol-Based Monopropellants", 38$^{th}$ AIAA/ASME/SAE/ASEE Joint Propulsion Conference & Exhibit, Jul. 7-10, 2002, 15 pgs. total.

* cited by examiner

LONG LIFE THRUSTER

RELATED APPLICATIONS

This application claims benefit of and priority to U.S. Provisional Application Ser. No. 61/840,582 filed Jun. 28, 2013 under 35 U.S.C. §§119, 120, 363, 365, and 37 C.F.R. §1.55 and §1.78 and is incorporated herein by this reference.

GOVERNMENT RIGHTS

This invention was made with U.S. Government support under Contract No. FA9300-11-C-3003 awarded by DOD SBIR Phase II. The Government may have certain rights herein.

FIELD OF THE INVENTION

This invention relates to thrusters used in space applications.

BACKGROUND OF THE INVENTION

Thrusters operating on hydroxylammonium nitrate (HAN)-based monopropellants are known. See for example "Catalytic Decomposition Of HAN-Water Binary Mixtures," Courthéoux, et al., 38$^{th}$ AIAA/ASME/SAE/ASEE Joint Propulsion Conference & Exhibit, Jul. 7-10, 2002 (published by the American Institute of Aeronautics and Astronautics); "Thermal Decomposition Characteristics of HAN Composite Propellant," Kuwahara et al., the American Institute of Aeronautics and Astronautics, Inc. (1997); and "HAN-based Monopropellant Assessment for Spacecraft," Robert S. Jankovsky, American Institute of Aeronautics and Astronautics, Inc. (1996), all incorporated herein by this reference.

Typically, a catalyst bed is used to disassociate the monopropellant. See U.S. Pat. No. 4,027,476 incorporated herein by this reference. In U.S. Pat. No. 6,931,832, also incorporated herein by this reference, a rhenium catalyst bed is used behind an aluminum oxide or zirconium oxide porous thermal barrier.

Due to the intense heat generated from using monopropellant fuels, conventional ceramic supported iridium catalysts can degrade. When new non-toxic monopropellants such as HAN or ammonium dinitramide (ADN) based formulations are used, their adiabatic flame temperatures are much higher than that of state of the art monopropellants such as hydrazine. This exacerbates the degradation problem associated with ceramic supported catalysts (either granular or foam types). Moreover, supported catalysts also require bed plates for containment which can be another failure mechanism as the bed plates are in direct contact with the high temperature gas products.

U.S. Pat. No. 4,485,722 discloses iridium, platinum, or ruthenium on an alumina catalyst. In another example, several pieces of expanded titanium sheet clad with platinum foil were used as a catalyst. See also Voecks et al. "Chemical Reactors Based on Catalyzed Wires" incorporated herein by this reference. The concept here was catalyst coated wires (twisted and straight) for a hydrazine monopropellant. Upon information and belief, this concept was never tested or reduced to practice. See also Smith et al. "Kinetics of Hydrazine Decomposition on Iridium and Alumina Supported Iridium Catalysts, Technical final report #AFRPL-TR-73-59, August 1973, distributed by National Technical Information Service, #AD-766 698/5, incorporated herein by this reference.

BRIEF SUMMARY OF THE INVENTION

Herein, an unsupported catalyst is used to address the degradation problem and which also makes fabrication easier. Ceramic supported catalysts are eliminated and bed plates are not needed. The subject invention, however, in other embodiments, need not achieve all these objectives and the claims hereof should not be limited to structures or methods capable of achieving these objectives.

Aspects of the invention include a thruster comprising a reactor including bundled metal elongate members therein configured to disassociate an introduced fuel flowing between the members. There may be a combustor for combusting products of the disassociation and a nozzle downstream of the combustor.

In one design, the elongate members are wires. In another design, the elongate members are tubes. Preferably, there is a ferrule about the elongate members compressing them. The ferrule can be fastened (e.g., welded) to an inside wall of the reactor. The elongate members can be made of platinum or transitional metal groups or combinations of the same. In one example, the elongate members are iridium wires. In another example, the elongate members are platinum or iridium tubes.

Also featured is a valve between a fuel source and the reactor. In one example, the valve includes a stem, a seat for the stem, and one or more piezoelectric actuators coupled to the stem for moving the stem from a seated position to an open position when a voltage is applied thereto. The wetted parts of the valve (e.g., the stem and seat) can be made of titanium.

In one design, there is another reactor stage including a catalyst bed upstream of the bundled elongate member reactor. In one example, the catalyst bed is a ceramic supported catalyst bed.

One thruster includes a reactor including a housing and a ferrule fixed inside the housing and compressed about a bundle of metal elongate members disposed in the reactor. One thruster comprises a reactor including bundled metal elongate members therein as wires and/or tubes made of platinum or transitional metal groups or combinations of the same disposed in a propellant path of the thruster.

One method comprises flowing a propellant into spaces between adjacent bundled metal elongate members to disassociate the propellant, combusting the propellant, and producing thrust. The elongate members may be wires and/or tubes. The elongate members may be made of platinum or transitional metal groups or combinations of the same. The elongate members may also be iridium wires and/or platinum tubes.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
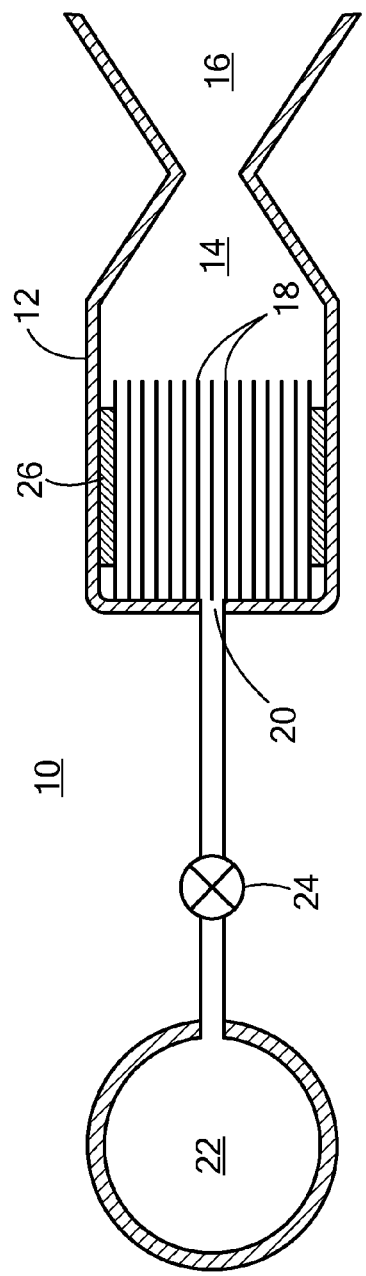
FIG. 1 is a schematic cross sectional view showing one example of a thruster in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one example, FIG. 1 shows thruster 10 with vessel 12 defining a reactor, a combustor 14, and nozzle 16. Various optional heater coils, voltage coils, an anode and the like are not shown. In one example, an induction heater coil is wrapped about housing 12.

The reactor includes bundled metal elongate members 18 in the flow path of the propellant entering the vessel via inlet 20 from source 22 and controlled by valve 24.

Figure 2:
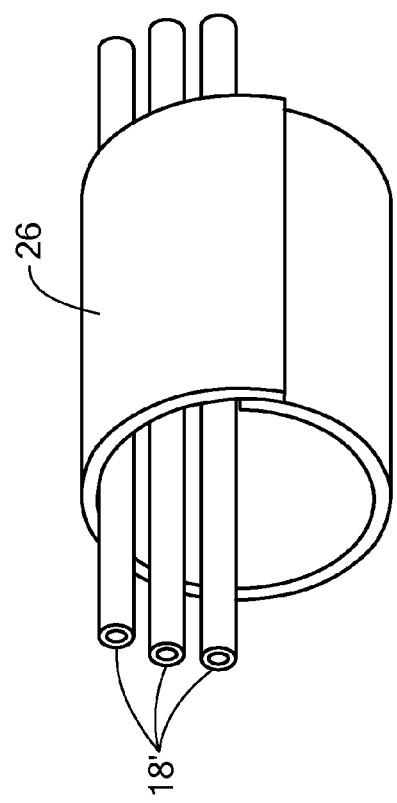
FIG. 2 is a schematic three dimensional view showing the use of bundled platinum tubes in the reactor portion of the thruster of FIG. 1.
Figure 3A:
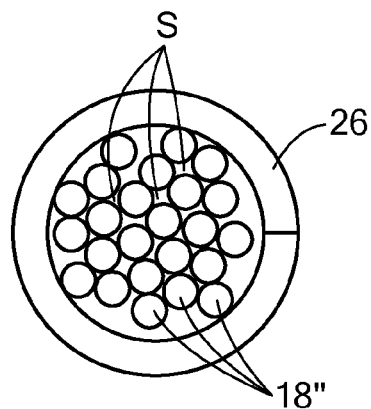
FIGS. 3A and 3B are views showing the use of solid iridium wires in the reactor portion of the thruster of FIG. 1.
Figure 3B:
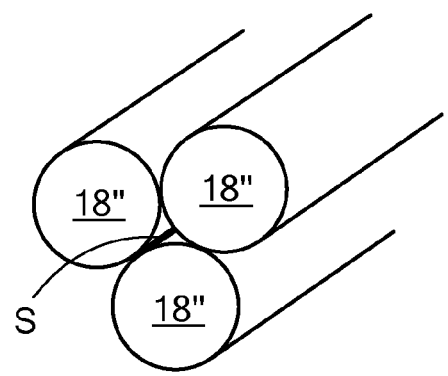

In one example, titanium tubes 18' are bundled together using ferrule 26, FIG. 2 which compresses the tubes. Ferrule 26 can then be welded to the inside of vessel 12, FIG. 1, which is typically in two or more sections. In another example, solid iridium wires 18", FIG. 3 are used and bound by ferrule 26. Preferably, the wires and/or tubes are the catalyst rather than merely supporting the catalyst. Preferably, the wires or tubes are not catalyst coated and are straight metal wires and used in connection with a Han based monopropellant. In one example, the wire may have a refractory metal core (e.g. molybdenum) and a cladding surface layer of platinum or iridium.

One result is a long-life reactor for decomposing or combusting liquid monopropellants. HAN-based monopropellants can be used but other propellants may be used as well. Some propellants like HAN-based monopropellants decompose and then combust while other propellants work by decomposition only such as hydrazine. Thus a variety of fuels may be used in connection with the reactor bundle described above.

The reactor used in the thruster configuration is easily scalable. Bundled wires or capillary tubes made from catalyst metals from the platinum or transitional metal groups and/or combinations thereof are advantageously used. Since ceramic supported catalysts are eliminated, the degradation problem associated with the use of monopropellants is addressed.

The welded ferrule design eliminates the need for additional containment bed plates for the reactor. The typically round wires or tubes can vary in material, length, diameter, and wall thickness as desired. In the bundled solid wire configuration, the propellant flows through the spaces between adjacent wires, FIG. 3B and about the wires. In the bundled tube configuration, the propellant flows through the tubes themselves as well as through the spaces between adjacent tubes. Thus, the propellant flow along the length of the wires or tubes in the bundle and thus through the bundle for disassociation. The fuel is then combusted and thrust is produced.

Figure 4:
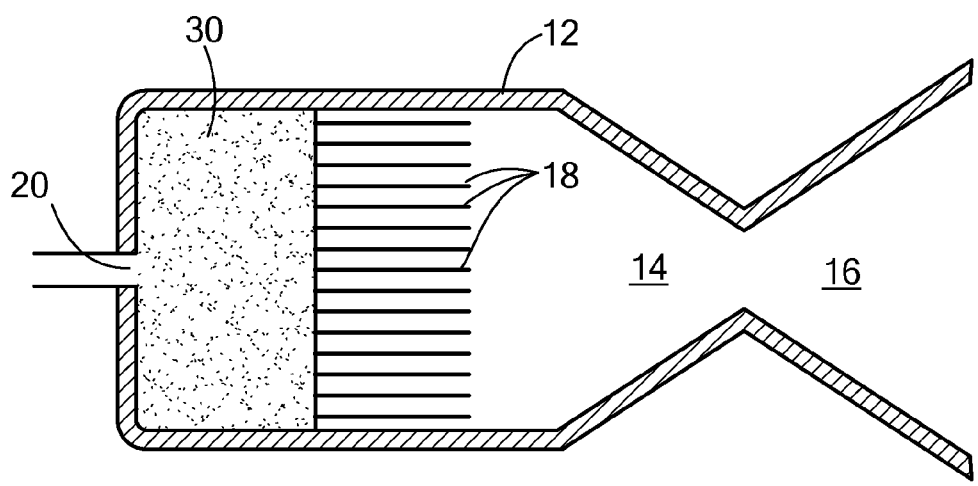
FIG. 4 is a schematic cross sectional view showing a two-stage reactor with a more traditional catalyst bed in the first stage and bundled elongate wires or tubes in the second stage.

In a two-stage design example, the reactor includes a more traditional (e.g., supported) catalyst bed 30, FIG. 4 upstream of solid metal bundle 18. The first stage is responsible for vaporizing and partially decomposing the monopropellant while the second stage facilitates the full decomposition or combustion. One advantage of such a two-stage design is a fast reaction without subjecting the ceramic supported catalyst bed to the full reaction temperature. The first stage ceramic supported catalyst bed may be fairly small in relation to the bundled metal reactor second stage. In one example, iridium was coated on porous alumina pellets to form a catalyst bed 30.

Figure 5:
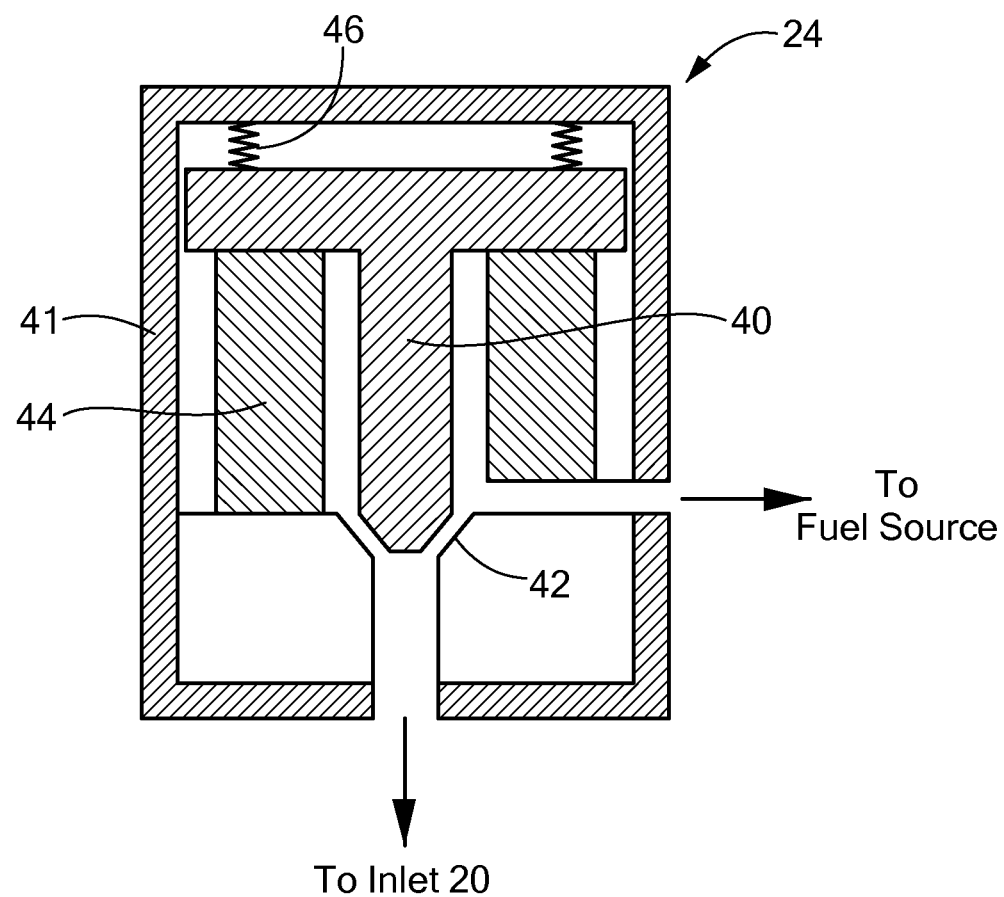
FIG. 5 is a schematic cross sectional view of an example of the valve shown in FIG. 1.

In FIG. 5, an example of one preferred valve 24 is shown. Stem 40 inside housing 41 operates to set in seat 42 in a closed position and to move to an unseated position in an open position allowing fuel from source 22, FIG. 1 to enter thruster 10. Piezoelectric actuator(s) 44 elongates to push valve stem 40 up (in the figure) when a voltage is applied to member 44. Removing the voltage, the piezoelectric member returns to its original shorter length and stem 40 seats (with the optional assistance of spring 46) in seat 42 closing the valve. Preferably, the valve is constructed of all-titanium wetted surfaces and does not have any elastomer seals. Titanium is inert to monopropellants and such a piezoelectric valve preferably consumes less than 1 watt of power compared to several watts or more required by conventional solenoid valves.

EXAMPLE

A test reactor including bundled iridium wires was tested with a HAN-based monopropellant. The wires successfully decomposed and combusted the monopropellant at pressures ranging from 100-300 psia without lifetime or performance issues.

Features of the invention are shown in some drawings and not in others, but this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A thruster comprising:
   a reactor including bundled wires and/or tubes made of platinum or transitional metal groups or combinations of the same therein, said wires and/or tubes configured to disassociate an introduced propellant flowing between the wires and/or tubes;
a combustor for combusting products of the disassociation; and
a nozzle downstream of the combustor.

2. The thruster of claim 1 further including a ferrule about the wires and/or tubes compressing them.

3. The thruster of claim 2 in which the ferrule is fastened to an inside wall of the reactor.

4. The thruster of claim 1 in which the wires are iridium wires.

5. The thruster of claim 1 in which the tubes are platinum tubes.

6. The thruster of claim 1 in which the wires and/or tubes have a metal core and a platinum or iridium clad surface layer.

7. The thruster of claim 1 further including a valve between a fuel source and the reactor.

8. The thruster of claim 7 in which the valve includes a stem, a seat for the stem, and one or more piezoelectric actuators coupled to the stem for moving the stem from a seated position to an open position when a voltage is applied thereto.

9. The thruster of claim 8 in which the stem and seat are made of titanium.

10. The thruster of claim 1 further including another reactor stage including a catalyst bed.

11. The thruster of claim 10 in which the reactor stage is upstream of the reactor.

12. The thruster of claim 10 in which the catalyst bed is a ceramic supported catalyst bed.

13. A thruster comprising:
a reactor including a housing and including bundled wires and/or tubes made of platinum or transitional metal groups or combinations of the same disposed in a propellant path of the thruster;
a ferrule fixed inside the housing and compressed about a bundle of metal elongate members disposed in the reactor.

14. A method comprising:
flowing a propellant into spaces between adjacent bundled wires and/or tubes made of platinum or transitional metal groups or combinations of the same to dissociate the propellant;
combusting the propellant; and
producing thrust.

15. The method of claim 14 in which the wires are iridium wires.

16. The method of claim 14 in which the tubes are platinum tubes.

17. The method of claim 14 in which the wires and/or tubes have a metal core and a platinum or iridium clad surface layer.

* * * * *